No. 871,240. PATENTED NOV. 19, 1907.
G. & F. SCHOEDELIN.
REDUCING GEAR.
APPLICATION FILED AUG. 30, 1906.
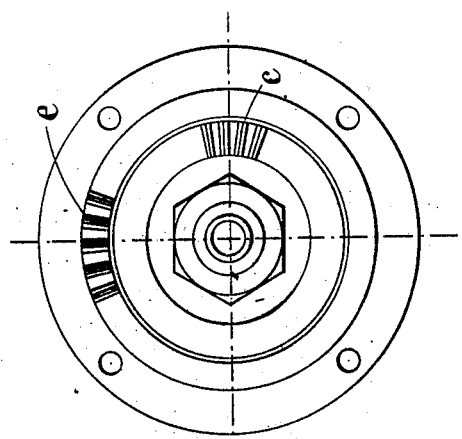
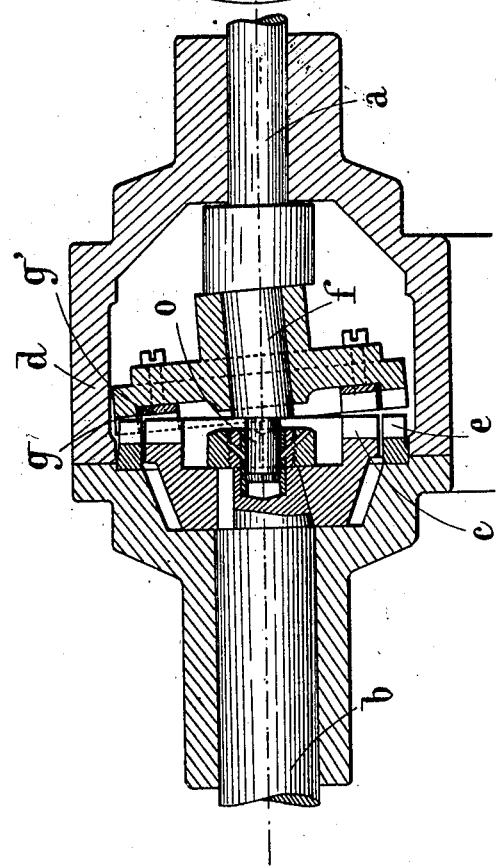
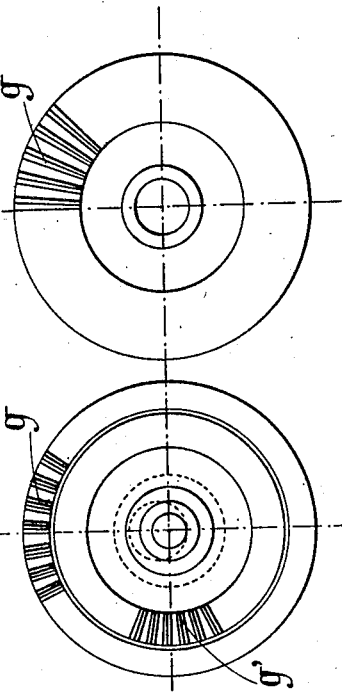
WITNESSES:
INVENTORS
Gaston Schoedelin
Fernand Schoedelin
BY
Max D. Ordmann
ATTORNEY

UNITED STATES PATENT OFFICE.

GASTON SCHOEDELIN AND FERNAND SCHOEDELIN, OF PARIS, FRANCE.

REDUCING-GEAR.

No. 871,240.

Specification of Letters Patent.

Patented Nov. 19, 1907.

Application filed August 30, 1906. Serial No. 332,572.

*To all whom it may concern:*

Be it known that we, GASTON SCHOEDELIN and FERNAND SCHOEDELIN, two citizens of the Republic of France, and residents of Paris, France, have invented a new and useful Improvement in Reducing-Gears, which improvement is fully set forth in the following specification.

The present invention has for its object a reducing gear which permits of attaining a very great reduction of speed by means of two gear wheels only.

The gear in accordance with the present invention comprises a bevel driving wheel mounted loosely upon a shaft which is given a conical movement of rotation, this wheel being at the same time guided in such a manner that it is unable to rotate while being free to oscillate, and a bevel wheel driven by the former, this driven wheel being mounted upon a shaft directed in the axis of the cone described by the shaft of the driving wheel.

It is only necessary that the driven wheel should have one or more teeth more or less than the driving wheel in order to oblige it to rotate, this speed of rotation being very small relatively to that of the driving shaft.

In order that the invention may be readily and clearly understood, various constructional forms of the gearing-down device forming the object of the invention, are illustrated by way of example in the accompanying drawing, in which:

Figure 1 is a longitudinal vertical section. Fig. 2 is a vertical cross-section, particularly illustrating the wheel solid with the gear case, and the wheel fixed upon the driven shaft. Fig. 3 is a detailed view showing the wheel upon the driving shaft, and the supplementary wheel used for large reductions of speed. Fig. 4 shows in detail the wheel upon the driving shaft for gearing down to a less extent.

In the arrangement represented in Fig. 1, $a$ is the driving shaft and $b$ the driven shaft. At the extremity of the driven shaft $b$, there is mounted a toothed wheel $c$ inclosed in the gear case $d$. A toothed crown $e$ is arranged in the same plane as the wheel $c$, and this wheel may be solid with the gear case, as here represented, or it may be rotary, and mounted so as to slide freely with a brake pulley, in accordance with the varying applications. Within the gear case $d$, the driving shaft $a$ comprises an oblique part $f$ of appropriate inclination, upon which a gear wheel $g$ is mounted. The height of the teeth of the wheel $g$ may be such as represented in Figs. 1 and 3; in this case, there is combined with the wheel $g$ a supplementary wheel $g'$ (Figs. 1 and 3), serving for gearing down to a large extent. The teeth of the wheel $g$ mesh with those of the crown $e$ and those of the wheel $g'$ with the teeth of the wheel $c$. In the case of gearing down to a smaller extent, the oblique part $f$ receives only the wheel $g$ (Fig. 4), the height of the teeth on which enables them to mesh simultaneously with the teeth of the crown $e$ and with those of the wheel $c$. In any event, the driving shaft $a$ terminates in a small bearing or stud $o$, and this projection, which is in line with the driving shaft, enters a hole formed at the end of the driven shaft $b$. The whole of this mechanism is inclosed in an oil bath gear case $d$.

Assuming for the moment that the driving wheel or the wheel mounted upon the driving shaft is the wheel $g$ (Fig. 4).

*First example of operation—Gearing down from 45 revolutions to 1 revolution.*—The driving wheel $g$ has 46 teeth; the toothed crown $e$, 45 teeth; the driven wheel $c$, 46 teeth. It follows from this combination that the driving shaft $a$ being caused to rotate and rotating 45 times for example, the driven shaft $b$ will make but one revolution. The wheel $g$ owing to the ratio of the teeth which it possesses with the crown, only makes one revolution for 45 revolutions of the driving shaft, and transmits this rotation, in its movement of oscillation, to the wheel $c$ solid with the shaft $b$. The two shafts rotate in the same direction.

*Second example—Gearing down from 45 revolutions to 1 revolution.*—The driving wheel $g$ has 44 teeth; the toothed crown, 45 teeth and the wheel $c$, 44 teeth. The shaft $a$ makes 45 revolutions while the shaft $b$ makes one revolution in the opposite direction, and as before the driving wheel $g$ rotates in the same direction and at the same speed as the shaft $b$.

*Third example—Gearing down from 45 to 1.*—The driving wheel $g$ has 46 teeth; the toothed crown $e$ 46 teeth, and the driven wheel $c$ 45 teeth. The driving shaft $a$ makes 45 revolutions, while the shaft $b$ makes 1 revolution in the opposite direction; the driving wheel oscillates without rotating.

*Fourth example—Gearing down from 45 to 1.*—The driving wheel $g$ has 44 teeth; the toothed crown $e$ 44 teeth, and the wheel $c$ 45 teeth. The shaft $a$ makes 45 revolutions, while the shaft $b$ makes 1 revolution in the same direction as the driving shaft; as before, the driving wheel oscillates without rotating. For large reductions of speed, the supplementary gear wheel $g'$ is added to the gear.

*First example of large reduction of speed.—* The toothed crown $e$ has 45 teeth; the gear wheel $g$ which meshes with the crown $e$ has 46 teeth; the gear wheel $g'$ which meshes with the driven wheel $c$ has 47 teeth, and the wheel $c$ 46 teeth. In these conditions the driving shaft $a$ will make 2070 revolutions for 1 revolution of the driven shaft. For 1 revolution of the shaft $a$, the driving wheel makes $\frac{1}{45}$ of a revolution forward, and during the same time causes the wheel $c$ mounted upon the shaft $b$ to make $\frac{1}{46}$ of a revolution backwards; from this it follows that this shaft in accordance with the calculation:

$$\frac{1}{45} - \frac{1}{46} = \frac{46}{2070} - \frac{45}{2070} = \frac{1}{2070}$$

accomplishes $\frac{1}{2070}$ of a revolution for one revolution of the driving shaft.

*Second example of large reduction of speed.—* The toothed crown $e$ has 100 teeth; the wheel $g$ 101 teeth, the wheel $g'$ 102 teeth, and the wheel $c$ 101 teeth. In these conditions, there is a reduction of $\frac{1}{100}$ of a revolution forward, less $\frac{1}{101}$ of a revolution backwards, that is to say:

$$\frac{1}{100} - \frac{1}{101} = \frac{101}{10100} - \frac{100}{10100} = \frac{1}{10100}$$

of a revolution in the same direction as the driving shaft.

It will of course be understood that the above concrete examples have only been given for the sake of clearness, as other reductions may be obtained merely by changing the teeth on the wheels, care also being had to appropriately arrange the original diameters of the wheels, so as to cause the wheels to mesh on the original diameter in order to prevent wear of the teeth.

In cases in which the toothed crown $e$ is mounted upon a brake pulley, as previously mentioned, it will be understood that upon releasing the brake the transmission of movement from the driving shaft to the driven shaft will cease. A suspended load would descend.

The gear forming the object of the present invention is applicable to all kinds of hoisting appliances or devices for dealing with loads such as winches, tackle, hoists, cranes, weigh-bridges, capstans, and so forth, and also to all other mechanisms requiring large reductions of speed.

As compared with endless screw transmission for large reductions of speed, this gear is advantageous owing to its higher efficiency, and to the reduction of the wear resulting from the large number of teeth which are in mesh at once when the inclination of the wheels is small.

Having thus described the nature of our invention, what we claim and desire to secure by Letters Patent is:

1. In a reducing gear, the combination with a driving shaft, having an inclined part, and a driven shaft, of a bevel wheel mounted on the inclined part of the driving shaft and a second wheel on the driven shaft, the axis of which coincides with that of the driving shaft, the wheel upon the inclined part of the driving shaft being adapted in rolling upon the second wheel to describe a cone and means to control the rotation of the driving gear, substantially as and for the purpose specified.

2. In a reducing gear, the combination with a driving shaft having an inclined part, and a driven shaft, of a bevel wheel, mounted upon the inclined part of the driving shaft and a toothed wheel mounted upon the driven shaft, the axis of both said shafts coinciding with each other, a case inclosing the said gear, a toothed crown arranged in the same plane as the driven wheel and solid with the gear case, a supplementary wheel connected with the driving wheel, the teeth of the latter being adapted to mesh with those of the crown and the teeth of the supplementary wheel to mesh with those of the driven wheel, substantially as and for the purpose specified.

In testimony whereof we have signed this specification in the presence of two subscribing witnesses.

GASTON SCHOEDELIN.
FERNAND SCHOEDELIN.

Witnesses:
EMILE LEDRET,
H. C. COXE.